(12) United States Patent
Oda

(10) Patent No.: US 6,628,698 B1
(45) Date of Patent: Sep. 30, 2003

(54) CDMA RECEPTION APPARATUS AND POWER CONTROL METHOD THEREFOR

(75) Inventor: Toshiyuki Oda, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/455,235

(22) Filed: Dec. 6, 1999

(30) Foreign Application Priority Data

Dec. 10, 1998 (JP) .......................................... 10-350962

(51) Int. Cl.⁷ ............................................... H04B 1/707
(52) U.S. Cl. ........................ 375/147; 375/349; 455/65; 455/134
(58) Field of Search ................................ 375/147, 148, 375/150, 260, 267, 227, 347, 349, 134, 137; 370/320, 335, 342, 328, 465, 480, 481, 482, 483, 491, 496, 497; 455/450, 455, 500, 501, 504, 505, 506, 65, 67.3, 134, 135, 137

(56) References Cited

U.S. PATENT DOCUMENTS

| | | | |
|---|---|---|---|
| 5,982,763 A | * 11/1999 | Sato | 370/342 |
| 5,999,560 A | * 12/1999 | Ono | 375/148 |
| 6,064,338 A | * 5/2000 | Kobayakawa et al. | 342/378 |
| 6,229,842 B1 | * 5/2001 | Schulist et al. | 375/148 |
| 6,373,882 B1 | * 4/2002 | Atarius et al. | 375/148 |
| 6,385,181 B1 | * 5/2002 | Tsutsui et al. | 370/335 |

FOREIGN PATENT DOCUMENTS

| | | |
|---|---|---|
| EP | 0 813 313 A2 | 6/1997 |
| EP | 0 794 627 A2 | 9/1997 |
| EP | 0 813 313 A2 | 12/1997 |
| EP | 0 825 727 A1 | 2/1998 |
| EP | 0 901 237 A2 | 3/1999 |
| EP | 0 932 263 A2 | 7/1999 |
| EP | 0 989 685 A2 | 3/2000 |
| GB | 2 343817 A | 5/2000 |
| JP | 7-231278 | 8/1995 |
| JP | 7-273689 | 10/1995 |
| JP | 09-181704 | 7/1997 |
| JP | 10-94041 | 4/1998 |
| JP | 11-234172 | 8/1998 |
| JP | 11-8606 | 1/1999 |
| JP | 11-266183 | 9/1999 |
| JP | 2000-4211 | 1/2000 |

* cited by examiner

Primary Examiner—Chi Pham
Assistant Examiner—Khanh Cong Tran
(74) Attorney, Agent, or Firm—Scully, Scott, Murphy & Presser

(57) ABSTRACT

A CDMA reception apparatus has a plurality of fingers and performs RAKE reception by RAKE-combining outputs from the plurality of fingers. The apparatus includes a multi-path detecting section and delay profile generating section. The multi-path detecting section detects a multi-path consisting of a plurality of radio waves arriving with some delay times by despreading a reception signal. The delay profile generating section generates a delay profile by obtaining the reception power levels of all reception signals in the multi-path detected by the multi-path detecting section. A difference $d_i$ in level between the signal having the ith highest level and the signal having the (i+1)th highest level of the data of the delay profile is obtained. The operation of a finger corresponding to a signal having a low level is stopped on the basis of the difference $d_i$ and a predetermined threshold $d_{TH}$.

9 Claims, 19 Drawing Sheets

CDMA RECEPTION APPARATUS AND POWER CONTROL METHOD THEREFOR

BACKGROUND OF THE INVENTION

1. Field of the Invention

The present invention relates to a CDMA reception apparatus and power control method therefor which are used for a mobile communication system and, more particularly, to a CDMA reception apparatus for performing RAKE reception and a power control method for the apparatus.

2. Description of the Prior Art

Conventionally, a mobile communication system using CDMA (Code Division Multiple Access) has been known.

In this CDMA mobile communication system, when data is to be transmitted from a mobile station to a base station, transmission data is transmitted after it is spread by using a corresponding one of spreading codes assigned to the respective mobile stations, and the base station demodulates the transmission data from each mobile station by despreading the data by using the spreading code assigned to each mobile station.

Likewise, data transmitted from a base station to a mobile station is also spread by a corresponding one of the spreading codes assigned to the respective mobile stations before it is transmitted. The resultant data is then transmitted.

In urban areas, in particular, various obstacles are present between a base station and a mobile station, and hence radio waves from the base station are often reflected by these obstacles and reach the mobile station. In such a situation, there are many reflected waves, which are reflected by various obstacles and reach the mobile station, between the base station and the mobile station as well as direct waves that directly reach the mobile station. That is, a so-called multi-path, in which there are a plurality of routes through which radio waves reach the mobile station, occurs.

The respective multi-path radio waves reach the mobile station with delay times corresponding to the respective routes. The mobile station therefore can improve reception quality owing to a path diversity effect by combining the multi-path radio waves in consideration of the delay times. This reception method will be referred to as a RAKE reception method.

A reception apparatus using this RAKE reception method needs to have fingers for despreading and the like equal in number to paths to a RAKE combiner. If, therefore, the number of paths to the RAKE combiner is too large, many fingers are required, resulting in increases in the size and cost of the apparatus. Considering that a mobile station moves all the time, the manner in which a multi-path occurs always changes. In some case, therefore, the use of too many fingers cannot allow the RAKE combiner to obtain a satisfactory reception quality improving effect, i.e., a path diversity effect.

For this reason, it is necessary to set the number of fingers to be set in the apparatus so as to obtain a reception quality improving effect by the RAKE combiner, i.e., a path diversity effect, to such an extent that the apparatus size does not increase too much.

In such a situation, in a CDMA reception apparatus having a limited number of fingers, the delay times in the respective fingers must be controlled to reliably capture multi-path radio waves.

As a conventional reception apparatus that solves this problem, the reception apparatus disclosed in Japanese Unexamined Patent Publication No. 9-181704 is available.

FIG. 1 is a block diagram showing the arrangement of a reception apparatus disclosed in Japanese Unexamined Patent Publication No. 9-181704. The first conventional apparatus will be described below with reference to FIG. 1.

Reference numeral 100 denotes a terminal to which a reception input spread signal is input; 200, a tracking finger for performing tracking and despreading; and 300, a search finger for detecting the level of a reception signal in each phase.

Reference numeral 402 denotes a RAKE combining path selecting section for selecting a phase of a spreading code in accordance with signals from the search finger 300 and tracking finger 200.

Reference numeral 403 denotes a pilot interpolation absolute synchronous detector for performing synchronous detection of the signal despread by the tracking finger 200.

Reference numeral 404 denotes a long code spreading code replica generator for supplying, to the tracking finger 200 or search finger 300, a spreading code replica corresponding to a specific channel to be used. The tracking finger 200 or search finger 300 uses this spreading code replica after delaying it by a predetermined amount through a spreading code replica delay section 206 or 305.

Reference numeral 405 denotes a RAKE combiner for combining signals from the respective paths; and 410, an output terminal.

Reference numerals 201, 202, 203, and 310 denote multipliers each serving to despread a reception signal by multiplying it by a spreading code replica; 204, 250, 207, and 302, integration dump circuits each serving to perform integration for a predetermined period of time; 208, 209, and 303, amplitude squaring circuits each serving to detect a signal level by performing amplitude squaring detection; and 304, a reception level memory for storing an output from the squaring circuit 303.

Reference numeral 210 denotes an adder for adding an output from the amplitude squaring circuit 208 to an output from the amplitude squaring circuit 209 with opposite polarities to generate a chip timing error signal associated with the spreading code replicas.

Reference numeral 211 denotes a loop filter for averaging the chip timing error signals from the adder 210 and outputting the resultant data. The data output from the loop filter 211 is input to a spreading code replica timing control signal generating section 212. In accordance with an output from the spreading code replica timing control signal generating section 212, the phase of the spreading code replica used by the RAKE combining path selecting section 402 for despreading.

The operation of the conventional technique shown in FIG. 1 will be described below.

The tracking finger 200 performs despreading by using a spreading replica code corresponding to a delayed path designated by the RAKE combining path selecting section 402 on the basis of the reception level detection information of all the chip phases of the search finger 300. The signal obtained by this despreading is demodulated.

As a demodulation scheme, delay detection, synchronous detection, or the like is available. In absolute synchronous detection, an absolute phase of reception must be estimated. In this prior art, the pilot interpolation absolute synchronous detector 403 performs absolute synchronous detection by estimating the phase of each information symbol by using a pilot signal and the phase of a pilot symbol as a reference phase.

In the tracking finger 200, the multipliers 201 and 202 perform correlation detection by using a reception spread/modulated signal and a replica code obtained by shifting a spreading code replica phase synchronized with the spreading code phase of a reception signal from each path by $\pm\Delta$ phase, and the integration dump circuits 204 and 205 performs integration for a predetermined period of time. The amplitude squaring circuits 208 and 209 then perform amplitude squaring detection to remove data modulation components and instantaneous phase variation components.

The adder 210 adds the amplitude square outputs of the spreading code replica obtained by the $+\Delta$ phase shift and the spreading code replica obtained by the $-\Delta$ phase shift with opposite polarities to generate a chip timing error signal associated with the spreading code replicas.

The loop filter 211 averages these chip timing error signals. The phase of the spreading code replica is updated in accordance with an output signal from the loop filter 211.

This phase update information is input to the RAKE combining path selecting section 402. The RAKE combining path selecting section 402 manages RAKE combining paths in real time to prevent overlaps between paths.

The RAKE combining path selecting section 402 updates the RAKE combining paths in predetermined cycles on the basis of an average delay profile of phase information search finger outputs of spreading code replicas corresponding to the respective paths to the RAKE combiner.

The RAKE combining path selecting section 402 generates spreading code replica signals for demodulation and generation of chip timing error signals in the tracking finger 200. The tracking finger 200 performs correlation detection of the spreading code replica corresponding to each path having this time delay and the input spread/modulated signal for a predetermined period of time, and inputs the integration output signal to the modulator, i.e., the pilot interpolation absolute synchronous detector 403.

According to the above reception apparatus disclosed in Japanese Unexamined Patent Publication No. 9-181704, to reliably capture multi-path radio waves with a limited number of fingers, the delay times of the respective fingers can be controlled.

The following problem is, however, posed in such a conventional reception.

The conventional reception apparatus is designed to use all fingers regardless of how a multi-path occurs. Assume that the number of paths in a multi-path is small, and hence a much effect cannot be obtained even by RAKE combining operation using many fingers. In this case, unnecessary fingers are operated to waste power.

As a conventional technique for solving such a problem, the receiver disclosed in Japanese Unexamined Patent Publication No. 7-231278 is available.

FIG. 2 is a block diagram showing the arrangement of the receiver disclosed in Japanese Unexamined Patent Publication No. 7-231278. The second conventional apparatus will be described below with reference to FIG. 2.

Reference numerals $50_1$ to $50_N$ denote the first to Nth spreading means for receiving direct spread/modulated signals with N paths and despreading/demodulating the respective direct spread/modulated signals S30 with the first to Nth spreading sequences synchronized with the N direct spread/modulated signals S30 received at different timings.

Reference numeral 51 denotes a combining means for combining output data $D40_1$ to $D40_N$ from the first to Nth despreading means $50_1$ to $50_N$, and 52 represents a control means for obtaining the level difference between one of the N direct spread/modulated signals S30 which has the highest level and each of the remaining signals. If each of the obtained level differences is equal to or higher than a threshold T, the combining means 51 turns off despreading means (e.g., $50_{N-2}$, $50_{N-1}$, and $50_N$) for despreading/demodulating signals having level differences of equal to or higher than the threshold T with respect to the signal having the highest level.

A path diversity effect can be satisfactorily obtained by using a RAKE receiver when signals having levels similar to each other to some degree are input through a multi-path. In addition, if a signal having a level noticeably (greatly) lower than the levels of a group of signals having levels similar to each other to some degree is input, the obtained diversity effect is small.

For a RAKE receiver, therefore, importance is attached to the way to extract only a signal group that provides a great diversity effect.

In the method of obtaining level differences from the highest levels, as in the receiver disclosed in Japanese Unexamined Patent Publication No. 7-231278, however, it is very difficult to extract only a signal group that can provide a great diversity effect. The reason for this difficulty will be described below.

FIG. 3 is a graph showing multi-path signals arranged in the descending order of levels.

Referring to FIG. 3, the signal having the highest level is represented by $L_1$, and signals having lower levels are sequentially represented by $L_2, L_3, \ldots$. In addition, the level difference between the signals $L_1$ and $L_2$ is represented by a; the level difference between the signals $L_2$ and $L_3$, b; and the level difference between the signals $L_3$ and $L_4$, c.

In this case, the expression "a signal group having levels similar to each other to some degree" indicates the signals $L_1$, $L_2$, $L_3$, and $L_4$ in FIG. 3. Assume that in the receiver disclosed in Japanese Unexamined Patent Publication No. 7-231278, the relationship between a threshold T and each signal level is represented by a+b<T and a+b+c>T. In this case, the signal $L_4$ is discarded although this signal can provide a great path diversity effect. If such a situation occurs in the case of a weak electric field, a deterioration in reception quality cannot be avoided.

At paragraph number 0028 in Japanese Unexamined Patent Publication No. 7-231278, it is described that "In addition, the threshold T is preferably set to a value corresponding to the level difference between one of the direct spread/modulated signals S30, with which no path diversity effect can be obtained by synthesis, and the signal having the highest level". In practice, however, the signal having the highest level always varies in level, and it is difficult to find "one of the direct spread/modulated signals S30, with which no path diversity effect can be obtained by synthesis". For this reason, it is very difficult or impossible to determine the value of the threshold T as described at paragraph number 0028.

SUMMARY OF THE INVENTION

The present invention has been made in consideration of the above problems in the prior art, and has as its object to provide a CDMA reception apparatus designed to change the number of fingers to be used for RAKE reception in accordance with an occurrence state of multi-path, which can guarantee reception quality even in a weak electric field as much as possible, and reduce a power consumption by stopping operation of unnecessary fingers.

In order to achieve the above object, according to the first main aspect of the present invention, there is provided a CDMA reception apparatus having a plurality of fingers and serving to perform RAKE reception by RAKE-combining outputs from the plurality of fingers, comprising multi-path detecting means for detecting a multi-path consisting of a plurality of radio waves arriving with some delay times by despreading a reception signal, and delay profile generating means for generating a delay profile by obtaining reception power levels of all reception signals in the multi-path detected by the multi-path detecting means, wherein (a) a difference $d_i$ in level between a signal having an ith highest level and a signal having an (i+1)th highest level of data of the delay profile is obtained, and operation of a finger corresponding to a signal having a low level is stopped on the basis of the difference $d_i$ and a predetermined threshold $d_{TH}$, (b) operation of a finger corresponding to a signal having a low level is stopped on the basis of a result obtained by comparing a threshold $L_{TH}$ with a level $L_i$ of a signal having an ith highest level of the data of the delay profile, or (c) if a level of a signal having a highest level of the data of the delay profile is not more than a predetermined threshold $L_{MAX}$, operation of all fingers is stopped.

The present invention has the following minor aspects associated with the first main aspect.

The difference $d_i$ in level between the signal having the ith highest level and the signal having the (i+1)th highest level of data of the delay profile is obtained, and operation of a finger corresponding to a signal having a level lower than that of the signal having the (i+1)th highest level is stopped if the difference $d_i$ is not less than the predetermined threshold $d_{TH}$.

In addition, if the difference $d_i$ in level between the signal having the ith highest level and the signal having the (i+1)th highest level of data of the delay profile is not more than a predetermined value, and a difference $d_{i+1}$ in level between the signal having the (i+1)th highest level and a signal having an (i+2)th highest level is not less than the predetermined value, operation of a finger corresponding to a signal having a level lower than that of the signal having the (i+2)th highest level is stopped.

If the level $L_i$ of the signal having the ith highest level of the data of the delay profile is not more than the predetermined threshold $L_{TH}$, operation of a finger corresponding to a signal having a level lower than that of the signal having the ith highest level is stopped.

The CDMA reception apparatus according to the main aspect further comprises a user input device by which a user can set the threshold.

The CDMA reception apparatus according to the main aspect further comprises display means for displaying information indicating the number of fingers, of the plurality of fingers, to which power is supplied.

Processing (c) in the main aspect is performed from the viewpoint that an improvement in reception characteristics takes priority over power saving in a weak electric field.

In order to achieve the above object, according to the second main aspect of the present invention, there is provided a power control method for a CDMA reception apparatus having a plurality of fingers and serving to perform RAKE reception by RAKE-combining outputs from the plurality of fingers, comprising the steps of detecting a multi-path consisting of a plurality of radio waves arriving with some delay times by despreading a reception signal, and generating a delay profile by obtaining reception power levels of all reception signals in the multi-path, wherein (a) a difference $d_i$ in level between a signal having an ith highest level and a signal having an (i+1)th highest level of data of the delay profile is obtained, and operation of a finger corresponding to a signal having a low level is stopped on the basis of the difference $d_i$ and a predetermined threshold $d_{TH}$, (b) operation of a finger corresponding to a signal having a low level is stopped on the basis of a result obtained by comparing a threshold $L_{TH}$ with a level $L_i$ of a signal having an ith highest level of the data of the delay profile, or (c) if a level of a signal having a highest level of the data of the delay profile is not more than a predetermined threshold $L_{MAX}$, operation of all fingers is stopped.

As is obvious from the above aspects, according to the present invention, when signals arriving through a plurality of radio waves in a multi-path are arranged in the descending order of signal levels, the level difference between adjacent signals is obtained, and the level difference is compared with a threshold. This makes it possible to detect "a signal group having levels similar to each other to some degree" in the prior art. Hence, RAKE reception can be performed by using signals that provide a great diversity effect, and reception quality can be guaranteed even in a weak electric field as much as possible.

According to the present invention, RAKE reception is performed without using signals having low levels by which only a small diversity effect can be obtained. With this operation, operation of unnecessary fingers is stopped. As a consequence, the power consumption can be reduced.

According to the present invention, therefore, a RAKE reception effect can be obtained, and power consumption can be optimized.

In addition, according to the present invention, if the level of the signal, of signals arriving through a plurality of radio waves in a multi-path, which has the highest level equal to or lower than the threshold $L_{MAX}$, all the fingers are operated. This makes it possible to obtain relatively high reception quality even in a weak electric field.

The above and many other objects, features and advantages of the present invention will become manifest to those skilled in the art upon making reference to the following detailed description and accompanying drawings in which preferred embodiments incorporating the principle of the present invention are shown by way of illustrative examples.

BRIEF DESCRIPTION OF THE DRAWINGS

FIG. 15 is a flow chart showing the processing to be performed after the mobile station in FIG. 6 is powered on;

DETAILED DESCRIPTION OF PREFERRED EMBODIMENTS

An embodiment of the present invention will be described in detail below with reference to the accompanying drawings.

In the embodiment described below, the present invention is applied to a mobile station in a CDMA mobile communication system.

Figure 1:
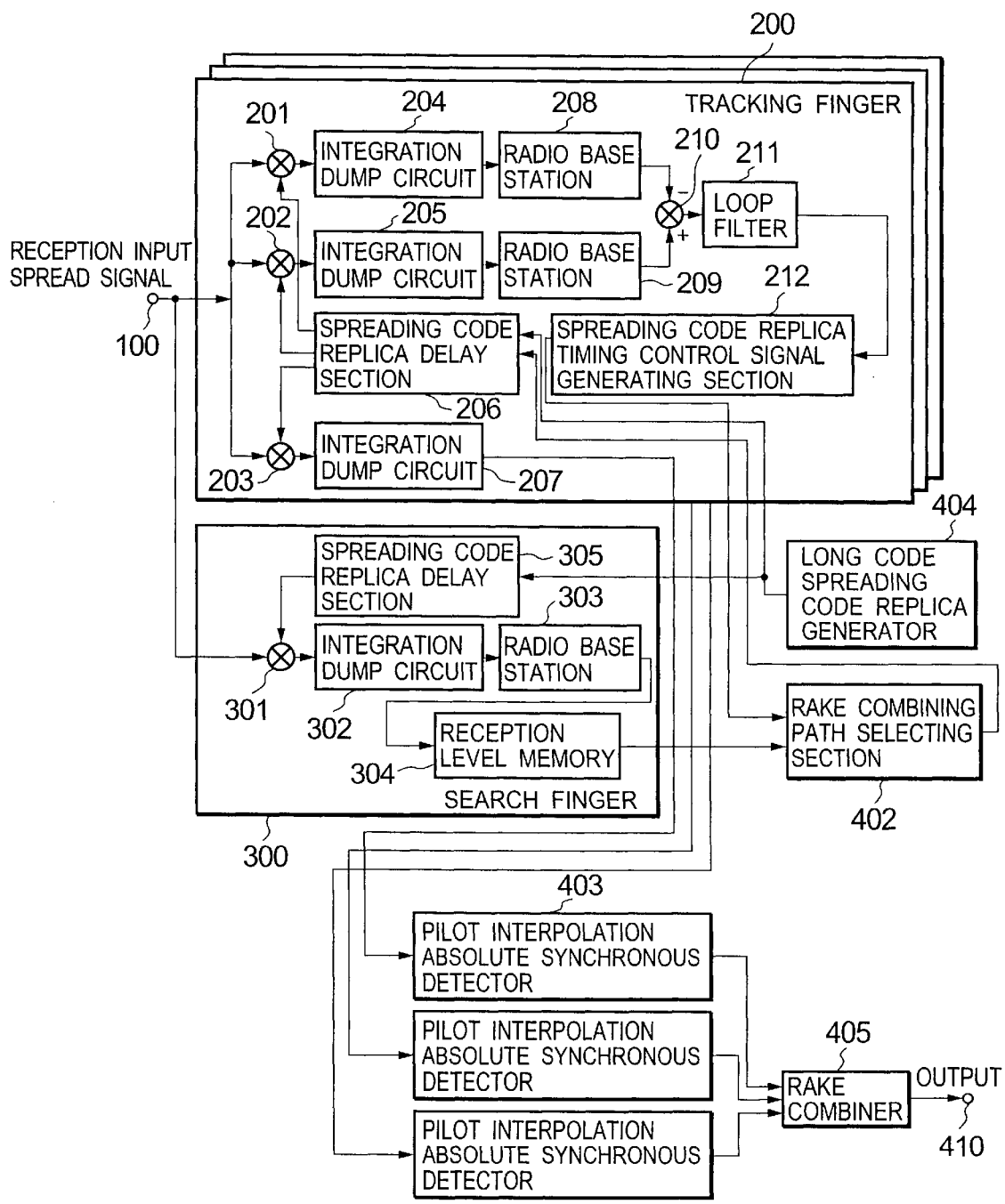
FIG. 1 is a block diagram showing the reception apparatus disclosed in Japanese Unexamined Patent Publication No. 9-181704.
Figure 2:
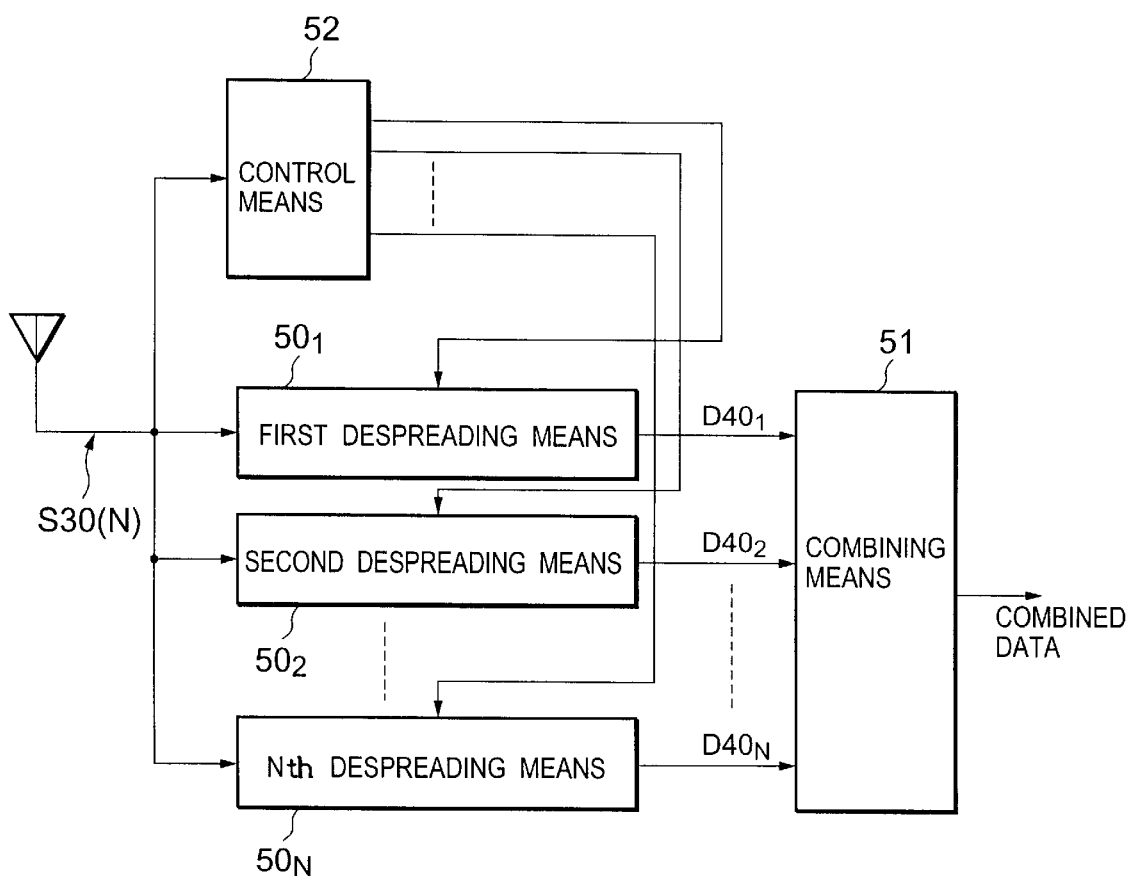
FIG. 2 is a block diagram showing the reception apparatus disclosed in Japanese Unexamined Patent Publication No. 7-231278.
Figure 3:
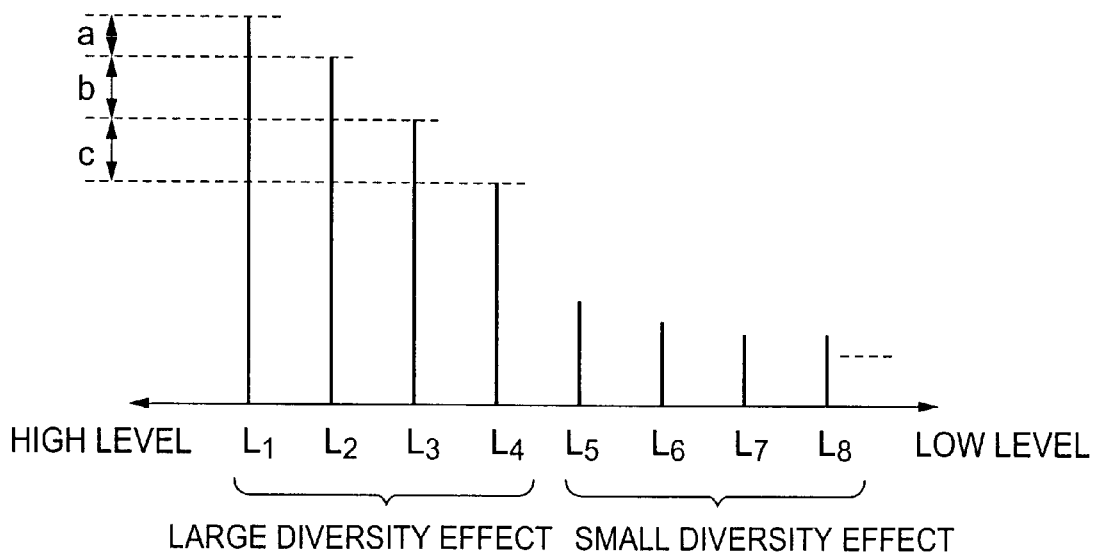
FIG. 3 is a graph showing multi-path signals sequentially arranged from the left side in the descending order of levels.
Figure 4:
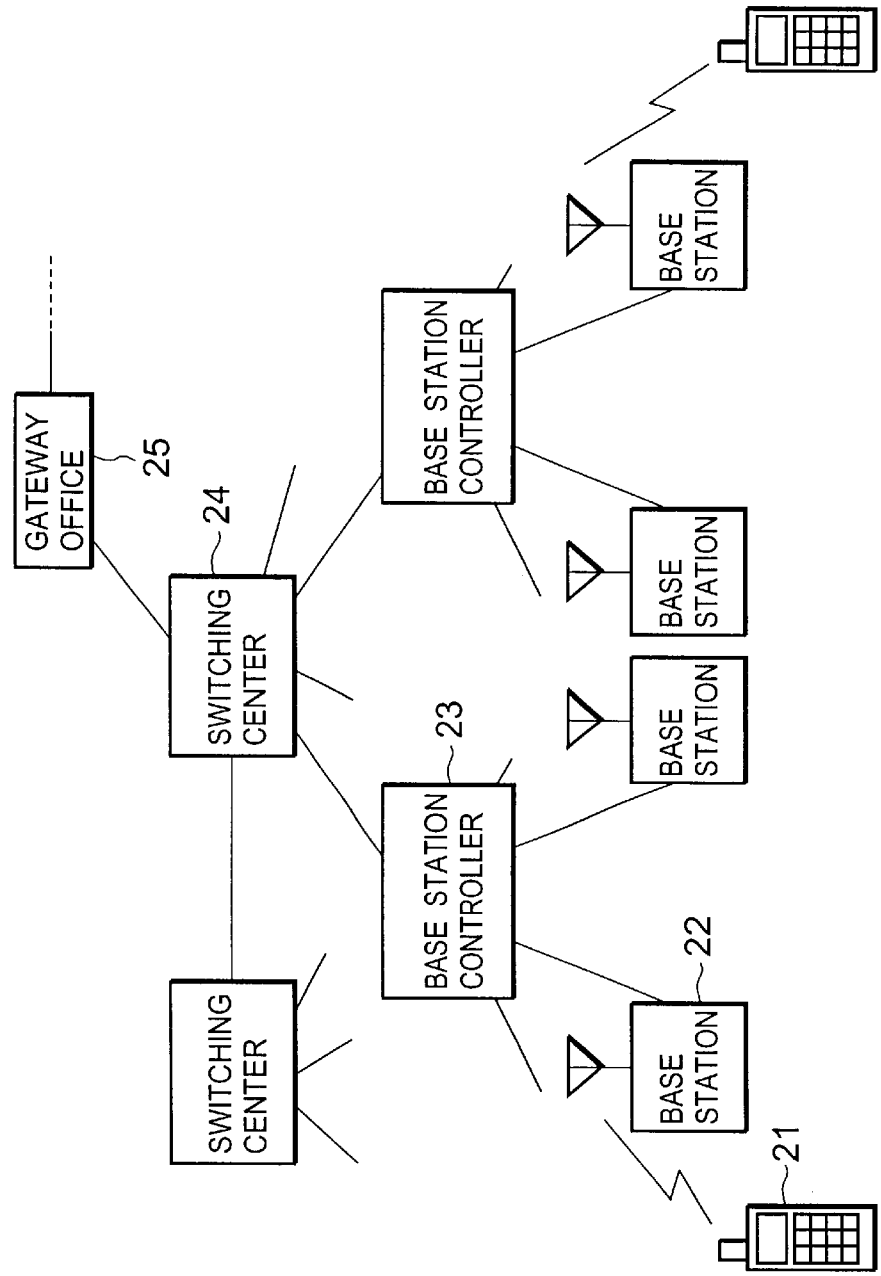
FIG. 4 is a block diagram schematically showing a CDMA mobile communication system to which a CDMA transmission apparatus according to the present invention is applied.

FIG. 4 is a block diagram showing the schematic arrangement of a CDMA mobile communication system to which a CDMA transmission apparatus according to the present invention is applied.

ATM (Asynchronous Transfer Mode) communication techniques and the like have been applied to base stations, base station controllers, and switching centers which constitute the network of a mobile communication system from the viewpoint of the diversification (growing trend toward multimedia) of services provided by the mobile communication system and the efficient use (statistical multiplexing) of a transmission path for connecting each base station, base station controller, and switching center.

A mobile unit 21 communicates with another mobile station, a terminal apparatus connected to another network, or the like through the mobile communication system. There are various types of communications, e.g., speech and data communications.

Transmission data from the mobile unit 21 is transmitted as communication data to a base station 22 by radio communication. The base station 22 assembles the communication data received from the mobile unit 21 or another mobile station into an ATM cell and performs various processes for the received data. The base station 22 then transmits the resultant data to a base station controller 23.

As described above, since communication data in a radio is transmitted as ATM cell information by a base station within the network regardless of whether the data is speech data, image data, or data in another form, this system can easily cope with a multimedia communication form.

The base station controller 23 routes the ATM cell received from the base station 22 for each user, and transmits it to a switching center 24 or another base station controlled by the base station controller 23. The switching center 24, like the base station controller 23, routes the ATM cell received from the base station controller 23 for each user, and transmits it to another switching center or a gateway office 25.

Such an ATM cell may be transmitted through a transmission path upon generation of an ATM cell, and there is no need to set a transmission path for each predetermined channel as in the prior art. This makes it possible to obtain a statistical multiplexing effect and efficiently use a transmission path. Note that the gateway office 25 is provided to relay a signal to another network.

Figure 5:
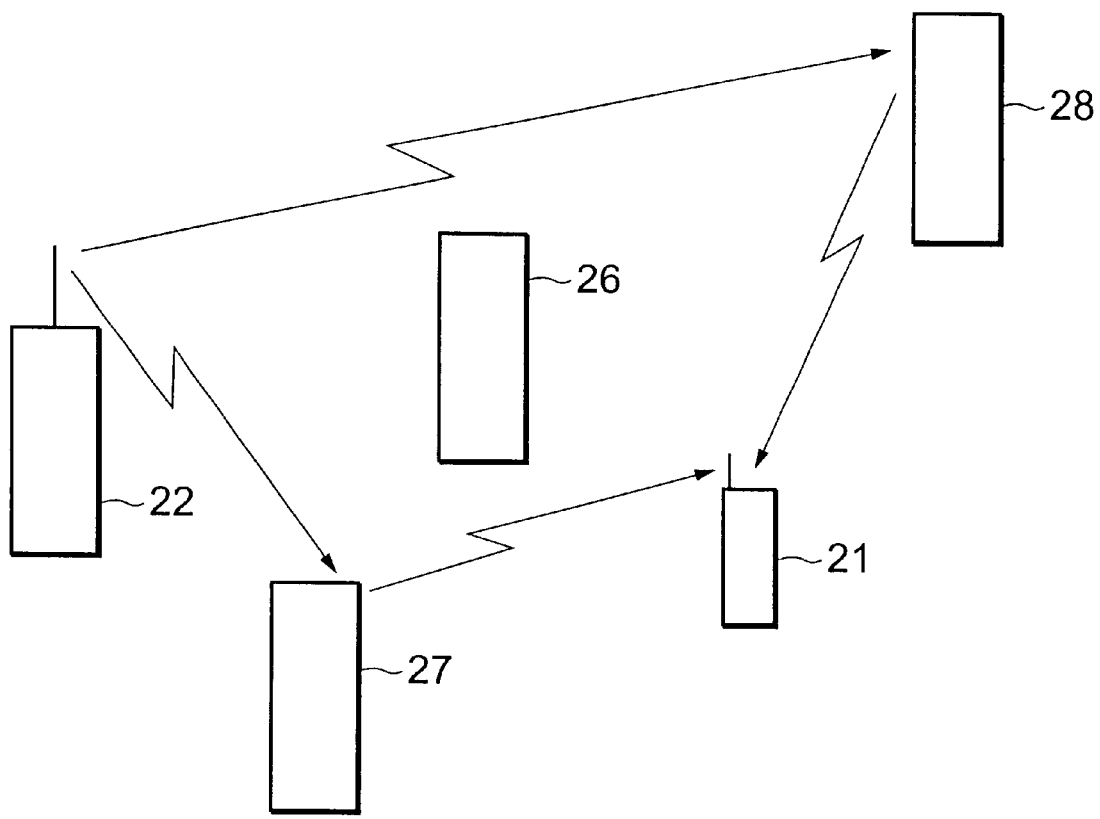
FIG. 5 is a view for explaining a multi-path.

FIG. 5 is a view for explaining a multi-path.

Various obstacles are present between the mobile unit 21 and the base station 22. In the case shown in FIG. 5, for example, an obstacle 26 is present between the mobile unit 21 and the base station 22, and radio waves that propagate straight from the base station 22 to the mobile unit 21 are blocked by the obstacle 26.

Even in this case, radio waves from the base station 22 can reach the mobile unit 21 after they are reflected by obstacles 27 and 28. In the case shown in FIG. 5, therefore, there are two routes taken to reach from the base station 22 to the mobile unit 21, i.e., the route in which radio waves are reflected by the obstacle 27 and reach the mobile unit 21 and the route in which radio waves are reflected by the obstacle 28 and reach the mobile unit 21. That is, a multi-path is present.

The route in which radio waves from the base station 22 are reflected by the obstacle 27 and reach the mobile unit 21 differs in distance from the route in which radio waves from the base station 22 are reflected by the obstacle 28 and reach the mobile unit 21. For this reason, the time taken for a radio wave to be reflected by the obstacle 27 and reach the mobile unit 21 differs from the time taken for a corresponding radio wave to be reflected by the obstacle 28 and reach the mobile unit 21.

In RAKE reception, the differences between the times taken for radio waves to reach through the respective multi-path routes are considered, and the respective radio waves are combined with delay times that cancel out the time differences, thereby obtaining a path diversity effect.

Since the mobile unit 21 moves as occasion demands, routes through which radio waves from the base station 22 reach the mobile unit 21 also change as occasion demands. As the mobile unit 21 moves, the number of routes through which radio waves from the base station 22 reach the mobile unit 21 changes, and the intensity of radio waves received by the mobile unit 21 through each route also changes. In addition, the delay times of the respective signals to the RAKE combiner change at all the times.

Figure 6:
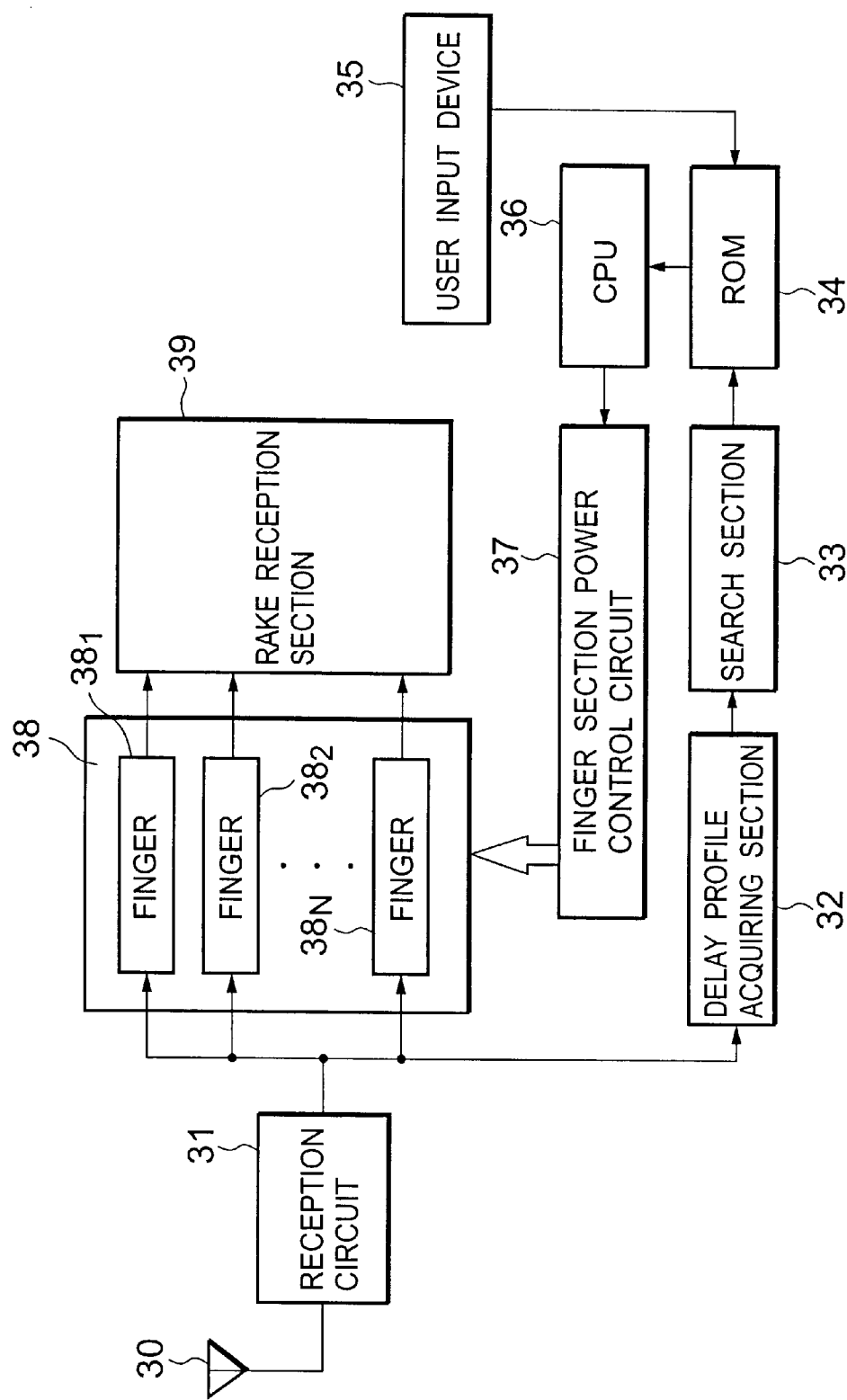
FIG. 6 is a block diagram showing a mobile station according to an embodiment of the present invention.

FIG. 6 is a block diagram showing a mobile station according to an embodiment of the present invention.

Referring to FIG. 6, the mobile unit 21 is comprised of an antenna 30 for receiving radio waves from the base station 22, a reception circuit 31 for, for example, demodulating a reception signal received through the antenna 30, a delay profile acquiring section 32 for obtaining the intensity of each multi-path signal by using an output from the reception circuit 31 and outputting the resultant data as a delay profile, a search section 33 for extracting data, of the data of the delay profile from the delay profile acquiring section 32, which correspond to the paths of signals having the highest intensity to an intensity of predetermined ordinal number, a user input device 35 used by the user to input to a threshold (to be described later), a ROM 34 storing the data extracted by the search section 33 and the threshold input through the user input device 35, a CPU 36 for executing processing for determining a finger which is to be powered on the basis of the data extracted by the search section 33 and stored in the ROM 34 and the threshold input through the user input device 35, a finger section 38 constituted by fingers $38_1$ to $38_N$ for despreading and demodulating an output from the reception circuit 31 with predetermined delay times, a finger section power control circuit 37 for controlling power to the finger section 38 on the basis of a notification from the CPU 36, and a RAKE reception section 39 for RAKE-combining signals from the respective fingers of the finger section 38.

FIG. 6 does not show the arrangement of the transmission side of the mobile unit 21 because it is irrelevant to the gist of the present invention.

Figure 7:
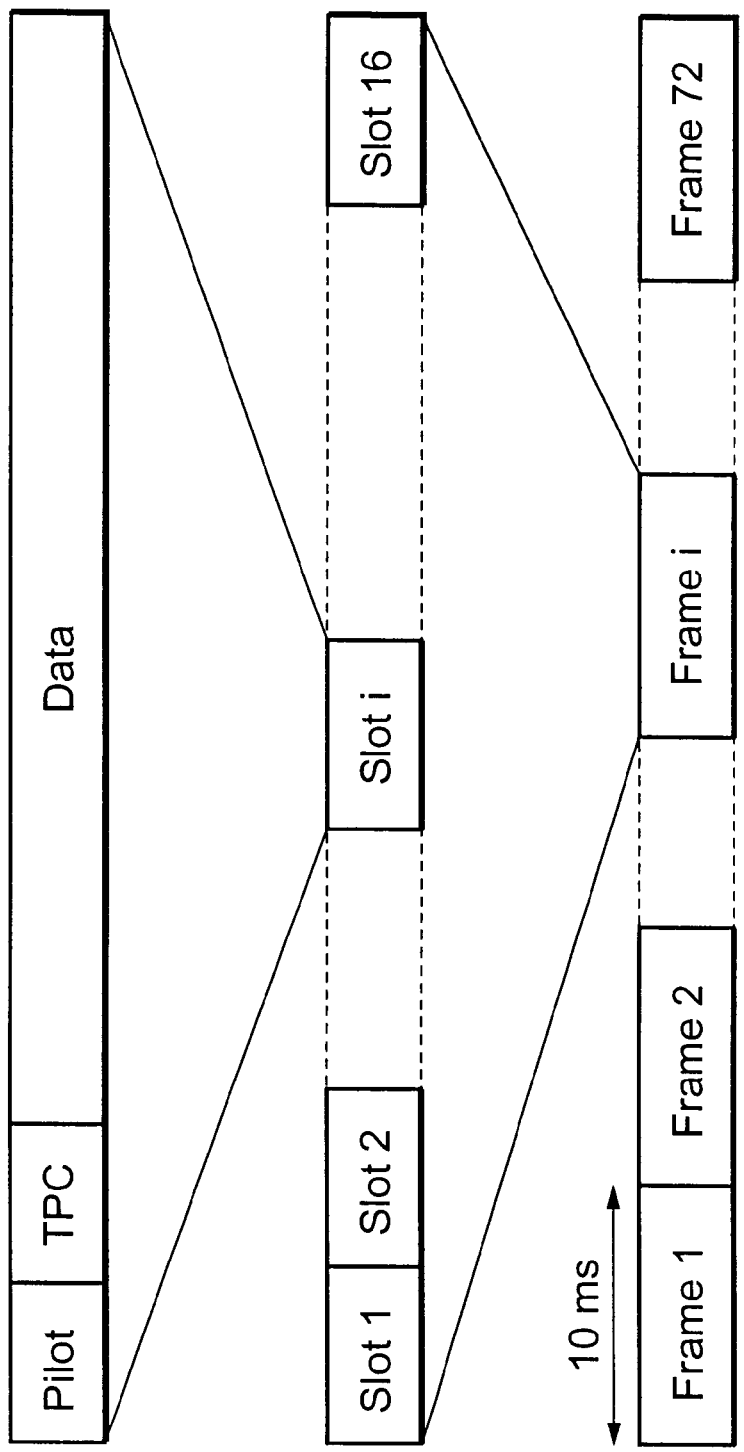
FIG. 7 is a view showing an example of the format of a signal transmitted from a base station to a mobile station in the embodiment shown in FIG. 6.

FIG. 7 is a view showing an example of the format of a signal transmitted from the base station 22 to the mobile unit 21.

In this case, the signal transmitted from the base station 22 to the mobile unit 21 is made up of 72 frames. The transmission time required for one frame is 10 ms.

Each frame is made up of 16 slots. Each slot is made of 256 chips. Referring to FIG. 7, one slot is made up of a pilot signal, TPC (Transmission Power Control) signal, and data signal.

As described above, since the transmission time for one frame is 10 ms, the transmission time for one ship is (0.625/256) ms.

Figure 8:
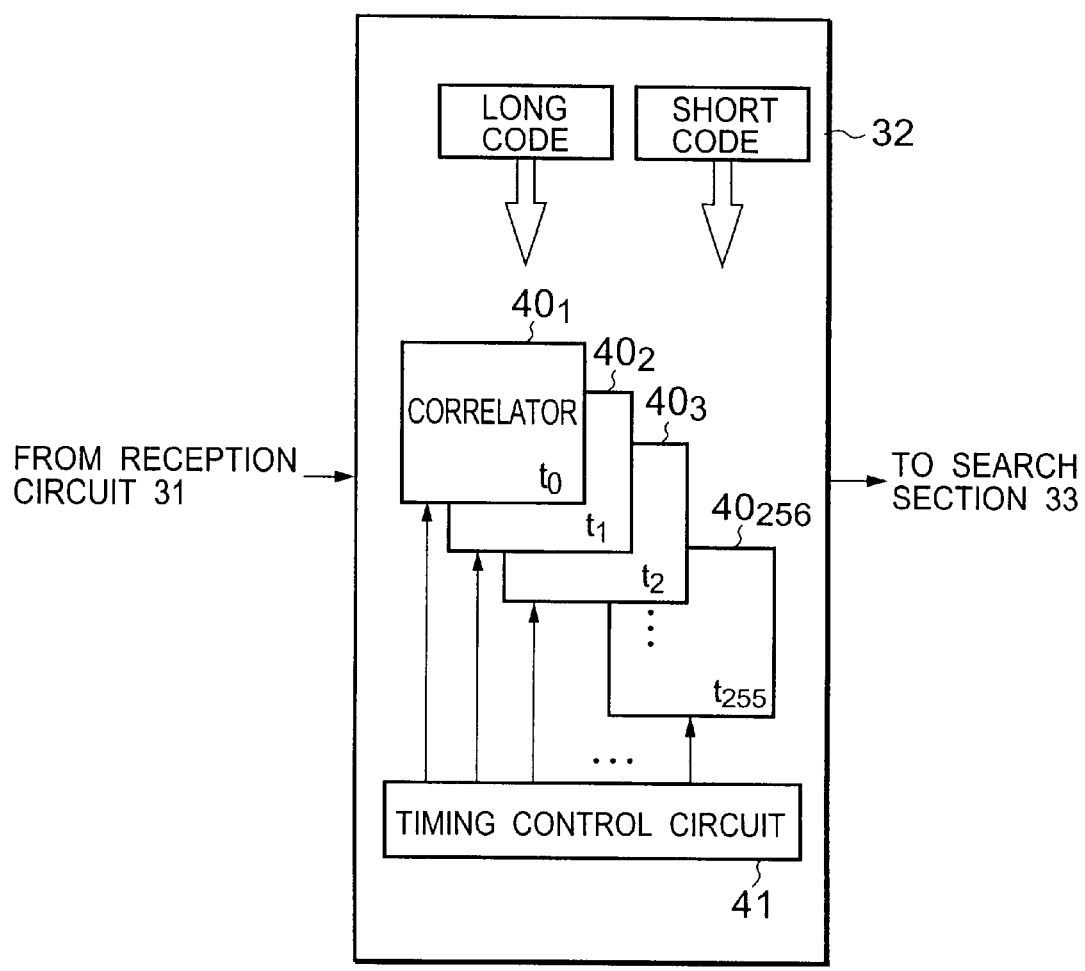
FIG. 8 is a block diagram showing an example of the arrangement of a delay profile acquiring section in FIG. 6.

FIG. 8 is a view showing an example of the arrangement of the delay profile acquiring section 32 in FIG. 6.

The delay profile acquiring section 32 is comprised of a plurality of correlators $40_1$ to $40_{256}$ for despreading a reception signal from the reception circuit 31 and a timing control circuit 41 for controlling the despreading timings of the plurality of correlators $40_1$ to $40_{256}$.

The 256 correlators $40_1$ to $40_{256}$ correspond to the number of chips in one slot described above, i.e., 256 chips.

Each of the correlators $40_1$ to $40_{256}$ is controlled by the timing control circuit 41 to despread a reception signal from the reception circuit 31 with a time shift corresponding to the transmission time for one chip, i.e., (0.625/256) ms.

Assume that the correlator $40_1$ starts despreading at time $t_0$. In this case, the correlator $40_2$ starts despreading at time $t_1$ delayed from time $t_o$ by (0.625/256) ms, and the correlator $40_3$ starts despreading at time $t_2$ delayed from time $t_1$ by (0.625/256) ms. The subsequent correlators sequentially despread the signal with delay times.

The spreading codes used in the correlators $40_1$ to $40_{256}$ are identical to those used by the base station 22 in spreading processing when transmitting the signal. It does not matter whether the spreading codes are long or short codes.

In the case shown in FIG. 8, correlators equal in number to the chips in one slot are prepared. However, the present invention is not limited to this. For example, correlators half the number of chips in one slot, i.e., 128 correlators, may be prepared. In this case, the first correlator performs despreading at the first time and 129th time; and the second correlator, at the second time and 130th time. In this manner, each correlator performs despreading twice sequentially.

The delay profile acquiring section 32 performs despreading in the above manner to generate a delay profile representing the correspondence between each despreading timing and the intensity of the signal obtained by the despreading. The delay profile acquiring section 32 then outputs this profile to the search section 33 in FIG. 6.

Figure 9:
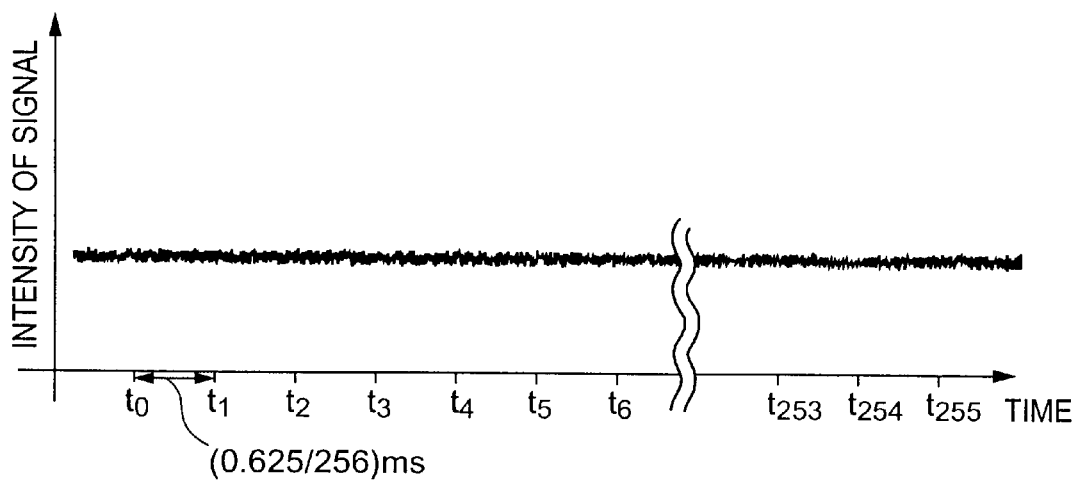
FIG. 9 is a graph showing a reception signal input to the delay profile acquiring section in FIG. 8.

FIG. 9 is a graph showing a reception signal input to the delay profile acquiring section 32 in FIG. 8.

Figure 10:
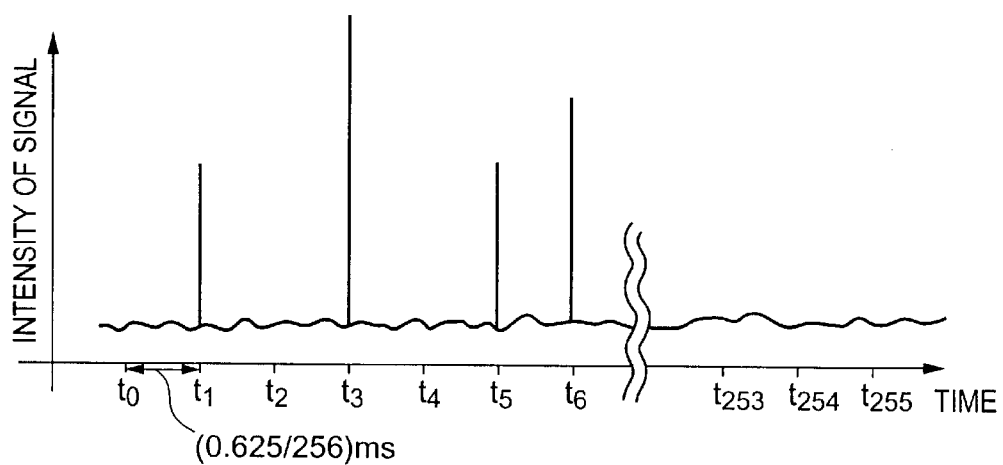
FIG. 10 is a graph showing the reception signal obtained by performing inverse conversion processing for the reception signal in FIG. 9 which is input to the delay profile acquiring section in FIG. 8.

FIG. 10 is a graph showing the input reception signal in FIG. 9 which has undergone inverse conversion processing in the delay profile acquiring section 32 in FIG. 8.

Referring to each of FIGS. 9 and 10, the ordinate represents the intensity of the signal; and the abscissa, the time.

As shown in FIG. 9, the reception signal, which is transmitted after being spread by the base station 22 with a spreading code and is received by the reception circuit 31, is spread to a wide band to become a signal with a noise level.

The delay profile acquiring section 32 despreads the signal in FIG. 9 to obtain the signal in FIG. 10.

As is apparent from FIG. 10, there is a correlation between times $t_1$, $t_3$, $t_5$, and $t_6$, and the signal is reconstructed. That is, in the case shown in FIG. 10, four paths corresponding to times $t_1$, $t_3$, $t_5$, and $t_6$ are produced in a multi-path.

The delay profile acquiring section 32 in FIG. 8 outputs times $t_0$ to $t_{256}$ and the signal intensities, i.e., signal levels, at times $t_0$ to $t_{256}$, which are obtained by the above despreading processing, as a delay profile, to the search section 33 in FIG. 6.

Figure 11:
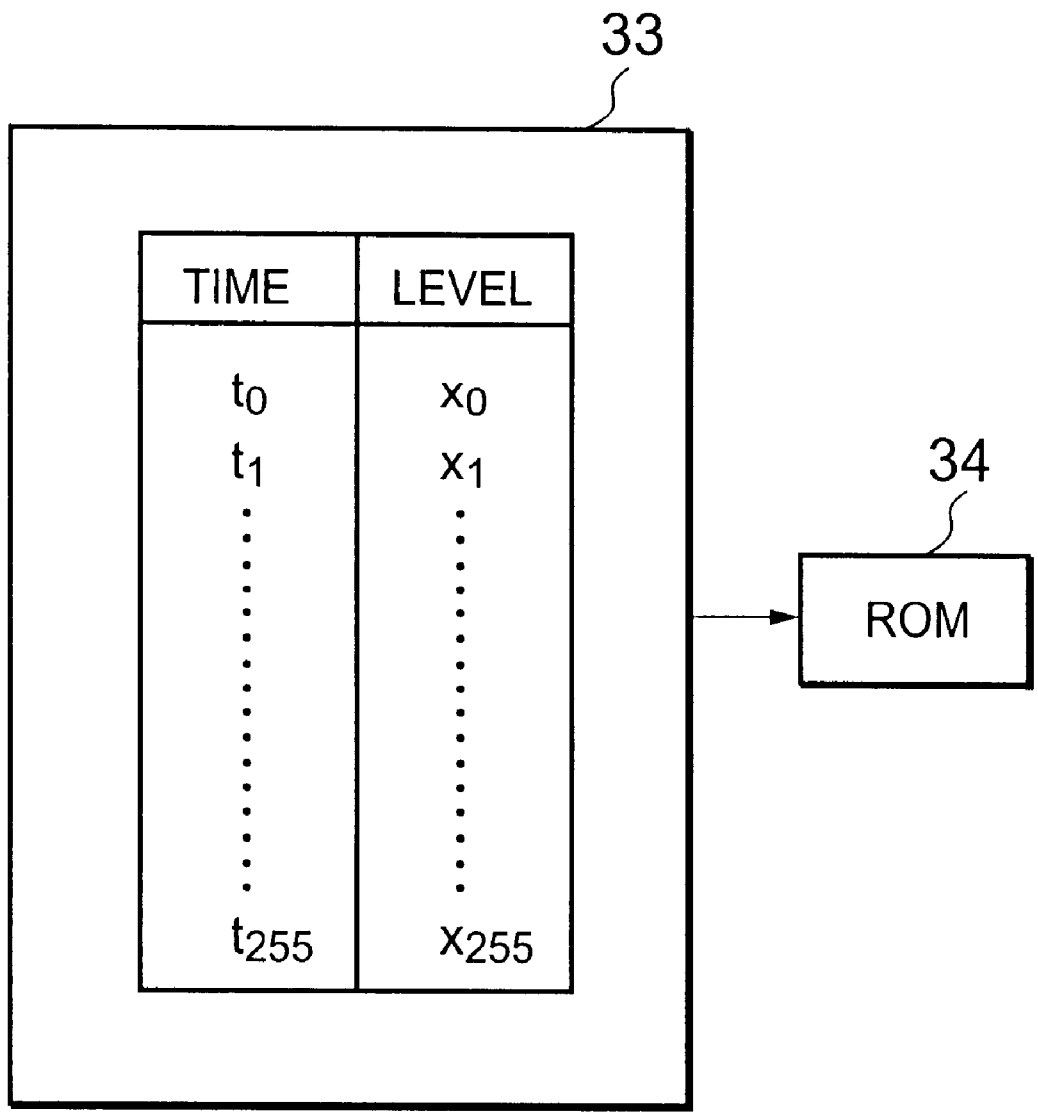
FIG. 11 is a view for explaining the operation of a search section in FIG. 6.

FIG. 11 is a view for explaining the operation of the search section 33 in FIG. 11.

The search section 33 outputs N data to the ROM 34 in the descending order of levels in the delay profile (expressed in a table form in the search section 33 in FIG. 11) from the delay profile acquiring section 32. In the case shown in FIG. 10, the data are sequentially output to the ROM 34 at times $t_3$, $t_6$, $t_1$, and $t_5$ in the descending order of levels.

The N data output from the search section 33 to the ROM 34 are preferably equal in number to the fingers in the finger section 38 in FIG. 6.

The ROM 34 in FIG. 6 is used to store the data with the higher levels which are extracted from the above delay profile data by the search section 33 and the user set value input through the user input device 35 in FIG. 6.

As the user input device 35, for example, buttons for inputting a user set value may be provided in the mobile station or a conventional ten-key pad for inputting a telephone number may be used. Alternatively, an external input device, e.g., a personal computer, may be connected to the mobile station to input a user set value. The user set value input through the user input device 35 is used in processing performed by the CPU 36 (to be described later).

Figure 12:
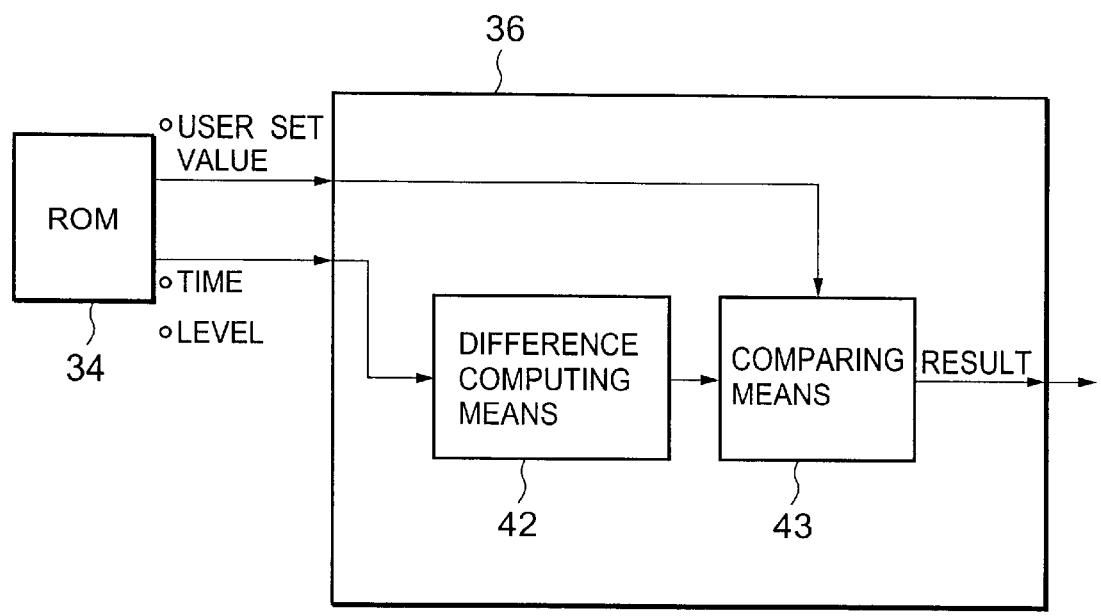
FIG. 12 is a block diagram showing function blocks in a CPU in FIG. 6.

FIG. 12 is a block diagram showing the functional blocks in the CPU 36 in FIG. 6.

As shown in FIG. 12, the CPU 36 reads out the user set value input through the user input device 35 and the times and levels as the data extracted from the delay profile by the search section 33 from the ROM 34. A difference computing means 42 computes and outputs the differences between the levels by using the times and levels read out from the ROM 34. A comparing means 43 compares the user set value read out from the ROM 34 with each of the differences between the levels, which are output from the difference computing means 42, and outputs data selected on the basis of the comparison result.

This processing by the CPU 36 will be described in detail later with reference to the flow chart of FIG. 15.

Figure 13:
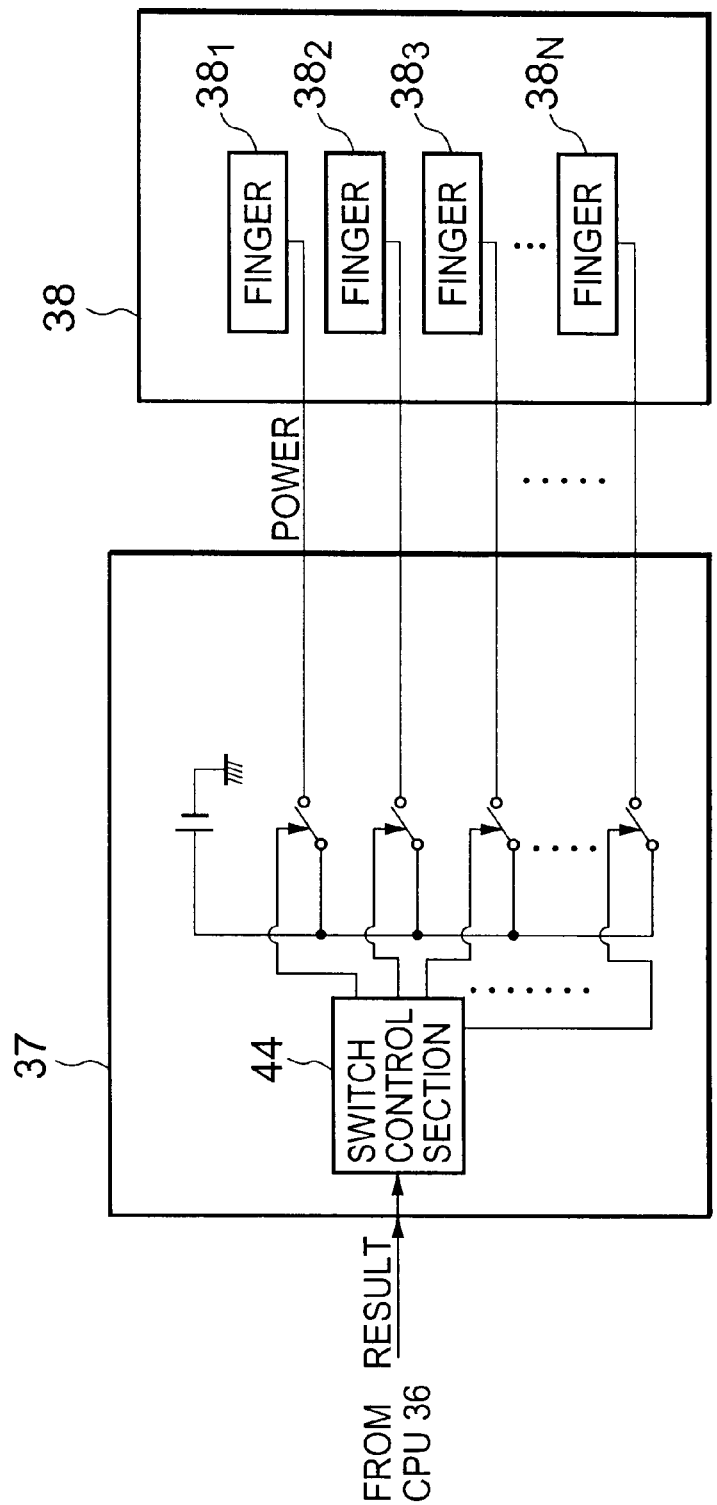
FIG. 13 is a block diagram showing the internal arrangement of a finger section power control circuit in FIG. 6.

FIG. 13 is a block diagram showing the internal arrangement of the finger section power control circuit 37 in FIG. 6.

The finger section power control circuit 37 has a switch control section 44. The switch control section 44 receives the computation result from the CPU 36 and controls switches for turning on/off power supplied to the fingers $38_1$ to $38_N$ in the finger section 38 on the basis of the received result. That is, the finger section power control circuit 37 controls the switches to supply power to only the fingers, of the fingers $38_1$ to $38_N$, which correspond to the delay times notified by the CPU 36.

Figure 14:
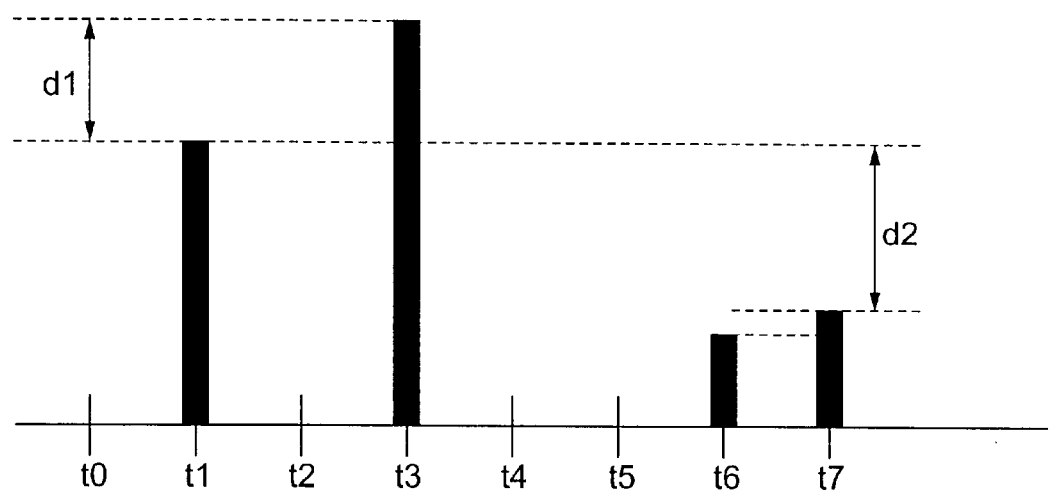
FIG. 14 is a graph showing an example of the delay profile output from the delay profile acquiring section in FIG. 6.

FIG. 14 shows an example of the delay profile output from the delay profile acquiring section 32 in FIG. 6.

In the case shown in FIG. 14, the level having the highest level is detected at time $t_3$; the signal having the second highest level, at time $t_1$; the signal having the third highest level, at time $t_7$; and the signal having the fourth highest level, at time $t_6$. Assume that the level difference between the signal having the highest level at time $t_3$ and the signal having the second highest level at time $t_1$ is represented by $d_1$, and the level difference between the signal having the second highest level at time $t_1$ and the signal having the third highest level at time $t_7$ is represented by $d_2$.

Assume that the threshold based on the user set value input through the user input device 35 is represented by $d_{TH}$, and $d_1 < d_{TH}$ and $d_2 > d_{TH}$. In this case, as a result of the comparison processing in the CPU 36 in FIG. 6, the CPU 36 notifies the finger section power control circuit 37 of the delay time of the signal at time $t_3$ and the delay time of the signal at time $t_1$.

Upon reception of this notification, the finger section power control circuit 37 supplies power to only the finger corresponding to the delay time of the signal at time $t_3$ and the finger corresponding to the delay time of the signal at time $t_1$, but no power is consumed for the remaining fingers.

Figure 15:
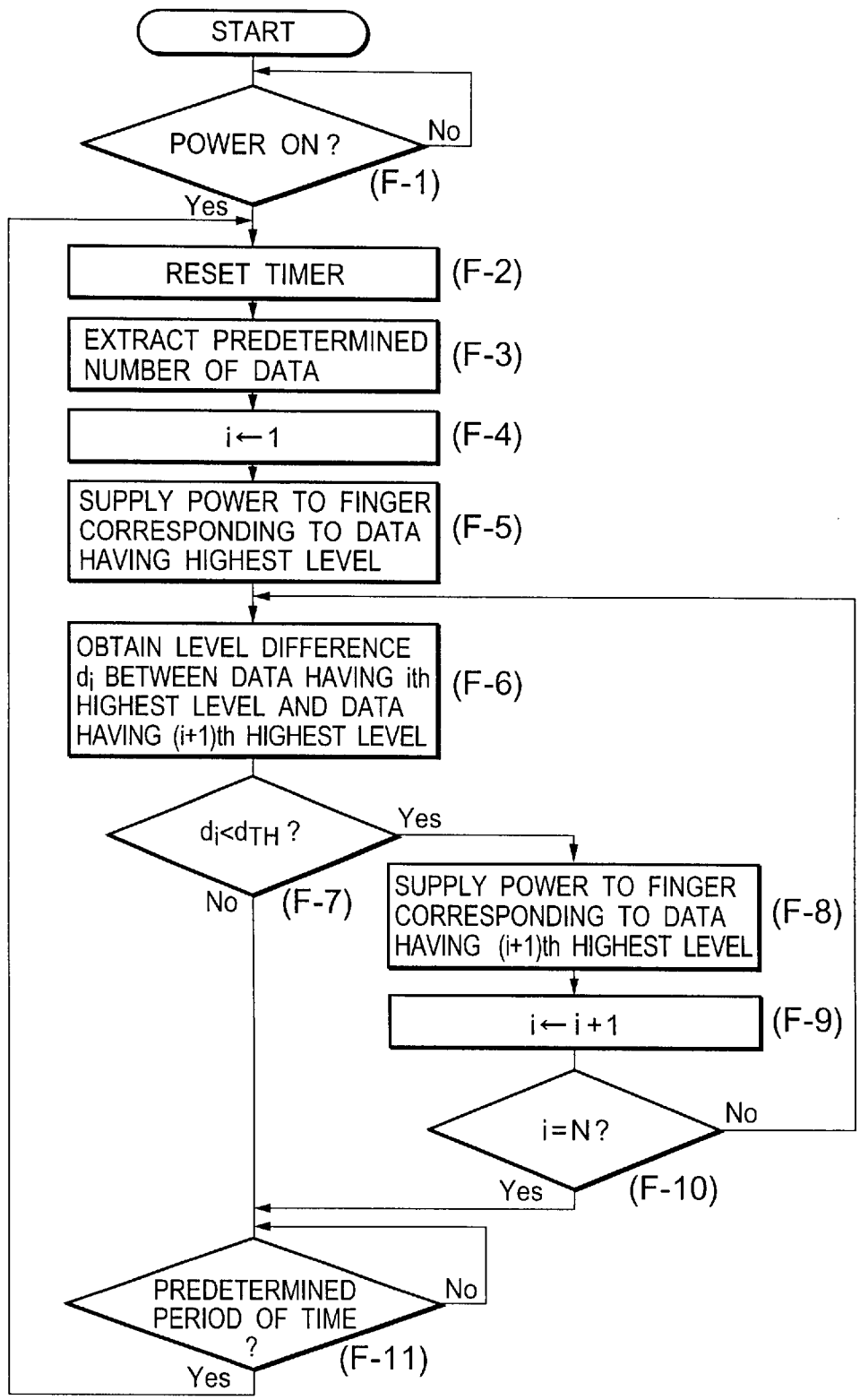

FIG. 15 is a flow chart showing the processing to be executed when the mobile unit 21 in FIG. 6 is powered on.

When the power is turned on (step F-1), the mobile unit 21 performs perch channel acquisition and repeats this processing subsequently. In this embodiment, processing of determining fingers to be operated is performed by this perch channel acquisition processing.

The processing performed by the CPU 36 will be described below with reference to the flow chart of FIG. 15.

First of all, a timer for detecting a lapse of a predetermined period of time is reset, and then operated (step F-2). The CPU 36 then causes the search section 33 to extract a predetermined number of data having higher levels from a delay profile (step F-3), and stores the extracted data in the ROM 34.

After the CPU 36 sets the initial value "1" in a loop counter i (step F-4), the CPU 36 selects the data having the highest level from the data extracted from the delay profile by the search section 33, which are read out from the ROM 34, and notifies the finger section power control circuit 37 of a time $t_d$ of this signal, i.e., the delay time of this signal. Upon reception of this notification, the finger section power control circuit 37 controls the switch control section 44 in FIG. 13 to supply power to the finger corresponding to the data having the highest level to operate the finger (step F-5). In the case shown in FIG. 10, since the signal at time $t_3$ has the highest level, the time $t_3$ is notified in step F-5.

In step F-6, the difference computing means 42 in FIG. 12 computes a difference. More specifically, in step F-6, the difference computing means 42 computes the level difference between the data having the ith highest level and the data having the (i+1)th highest level, of the data extracted from the delay profile by the search section 33. This computation result is represented by $d_i$.

In step F-7, the comparing means 43 in FIG. 12 compares the differences with each other. This difference comparison processing will be described below.

The user set value read out from the ROM 34 is used as a threshold $d_{TH}$ as a comparison target to be compared with the difference $d_i$ obtained in step F-6. It is expected that the user has difficulty in inputting this threshold as a specific numerical value. For this reason, it is preferable to allow the user to select numerical values set in the process of designing the apparatus in a step-by-step manner by using the user input device 35 instead of inputting a specific numerical value.

In step F-7, the CPU 36 checks whether the difference $d_i$ which has the value of the loop counter i as a numerical subscript is smaller than the threshold $d_{TH}$.

If it is determined in step F-7 that the difference $d_i$ is not smaller than the threshold $d_{TH}$, the flow waits for a lapse of a predetermined period of time (step F-11). When the predetermined period of time elapses, the flow returns to step F-2 to repeat finger operation control. As the predetermined period of time in step F-11, for example, the time corresponding to one slot of reception data is set.

If it is determined in step F-7 that the difference $d_i$ is not smaller than the threshold $d_{TH}$ when the value of the loop counter i is 1, the CPU 36 notifies the finger section power control circuit 37 of only the value $t_d$, i.e., the delay time, of the signal of the data, of the data extracted by the search section 33 from the delay profile read out from the ROM 34, which has the highest level. In this case, therefore, the finger section power control circuit 37 supplies power to only the finger corresponding to the delay time of only one signal notified as the result from the CPU 36.

If it is determined in step F-7 that the difference $d_i$ is smaller than the threshold $d_{TH}$, the CPU 36 notifies the finger section power control circuit 37 of the value $t_d$, i.e., the delay time, of the signal of the data, of the data extracted by the search section 33, which has the (i+1)th highest level. Upon reception of this notification, the finger section power control circuit 37 controls the switch control section 44 in FIG. 13 to supply power to the finger corresponding to the data having the (i+1)th highest level, thus operating the finger (step F-8).

After the loop counter i is incremented by one (step F-9), the CPU 36 checks whether the value of the loop counter i is equal to N, obtains the differences from all the data extracted by the search section 33, and checks whether comparison with the threshold $d_{TH}$ is performed (step F-10).

If it is determined in step F-10 that the value of the loop counter i is equal to N, and comparison with the threshold $d_{TH}$ is complete, the flow waits for a lapse of a predetermined period of time (step F-11) and returns to step F-2 when the predetermined period of time elapses, thus repeating finger operation control.

If it is determined in step F-10 that the value of the loop counter i is not equal to N, and comparison with the threshold $d_{TH}$ is not complete, the flow returns to step F-6 to continue the processing.

Figure 16:
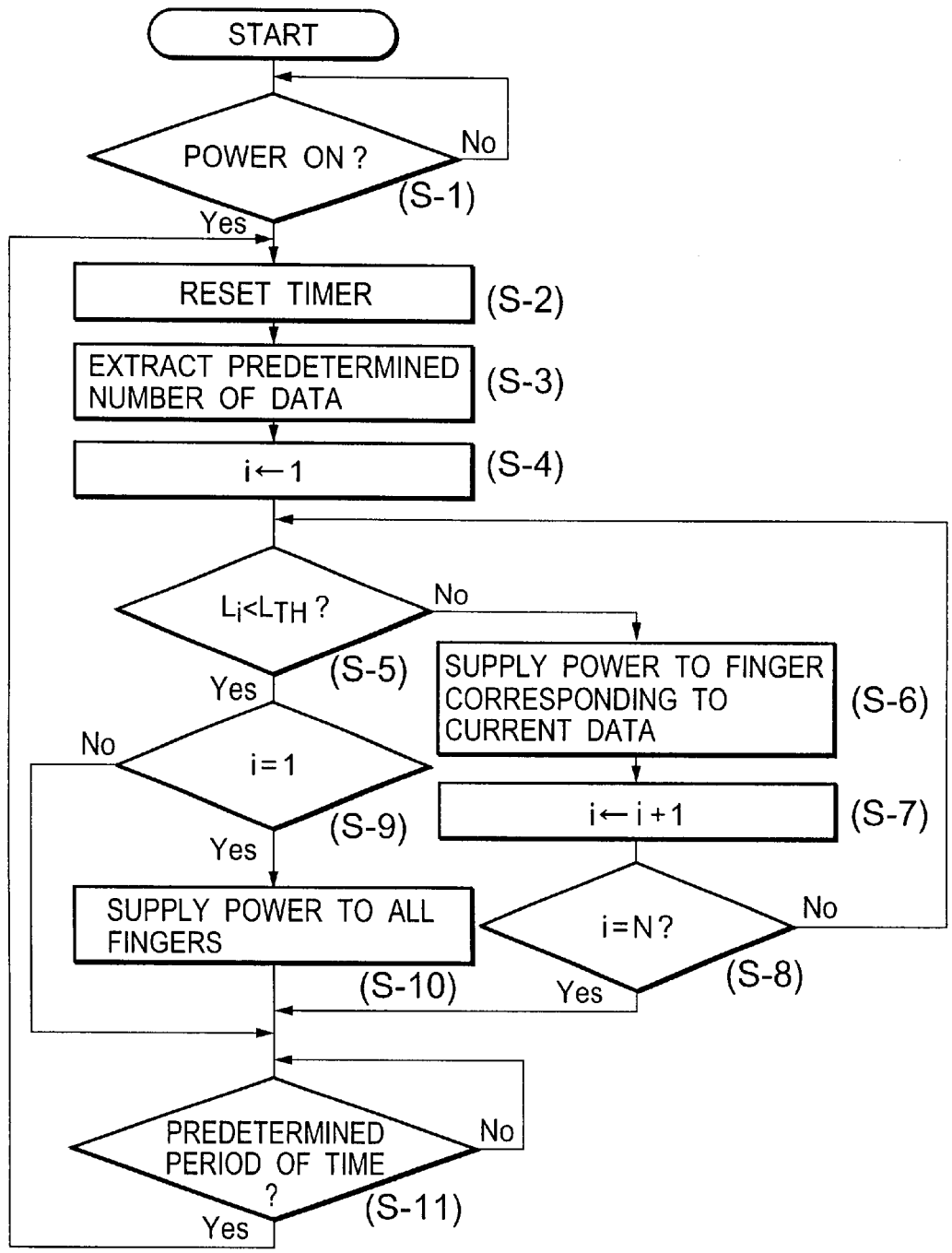
FIG. 16 is a flow chart showing the processing to be performed after the mobile station in FIG. 6 is powered on, which processing differs from that shown in the flow chart of FIG. 15.

FIG. 16 is a flow chart showing the processing to be performed after the mobile unit 21 is powered on. This processing differs from that shown in the flow chart of FIG. 15.

In the processing shown in FIG. 15, the difference from the level of each signal is acquired and compared with the threshold. In the processing shown in FIG. 16, the level of each signal is directly compared with a threshold.

When the power is turned on (step S-1), the mobile unit 21 performs perch channel acquisition processing, and repeats this processing subsequently. In this embodiment, processing of determining fingers to be operated is performed by this perch channel acquisition processing.

The processing performed by the CPU 36 will be described below with reference to the flow chart of FIG. 16.

First of all, the timer for detecting a lapse of a predetermined period of time is reset, and then operated (step S-2). The CPU 36 then causes the search section 33 to extract a predetermined number of data having higher levels from a delay profile (step S-3), and stores the extracted data in the ROM 34. The CPU 36 then sets the initial value "1" in the loop counter i (step S-4).

In this case, the user set value read out from the ROM 34 is used as a threshold $L_{TH}$ as a comparison target to be compared with the level of each signal. As in the case shown in FIG. 15, it is expected that the user has difficulty in inputting this threshold as a specific numerical value. For this reason, it is preferable to allow the user to select numerical values set in the process of designing the apparatus in a step-by-step manner by using the user input device 35 instead of inputting a specific numerical value.

In step S-5, provided that the level of the signal having the ith highest level is represented by $L_i$, the CPU 36 checks whether the level $L_i$ having the value of the loop counter i as a numerical subscript is lower than the threshold $L_{TH}$.

If it is determined in step S-5 that the level $L_i$ is lower than the threshold $L_{TH}$, the CPU 36 checks whether the value of the loop counter i is 1 (step S-9). If it is determined in step S-9 that the value of the loop counter i is 1, power is supplied to all the fingers (step S-10). The flow then advances to step S-11. Otherwise, the flow directly advances to step S-11.

In step S-11, the flow waits for a lapse of a predetermined period of time, and returns to step S-2 when the predetermined period of time elapses, thus repeating finger operation control.

If it is determined in step S-5 that the level $L_i$ is not lower than the threshold $L_{TH}$, the CPU 36 notifies the finger section power control circuit 37 of the value $t_d$ of the current signal. More specifically, the CPU 36 notifies the finger section power control circuit 37 of the value $t_d$, i.e., the delay time, of the signal of the data, of the data extracted by the search section 33 from the delay profile read out from the ROM 34, which has the ith highest level. Upon reception of this notification, the finger section power control circuit 37 controls the switch control section 44 in FIG. 13 to supply power to the finger corresponding to the current data, thereby operating the finger (step S-6).

After the loop counter i is incremented by one (step S-7), the CPU 36 checks whether the value of the loop counter i is equal to N, and checks whether comparison between the levels of all the signals and the threshold $L_{TH}$ is complete (step S-8).

If it is determined in step S-8 that the value of the loop counter i is equal to N, and comparison between the levels of all the signals and the threshold $L_{TH}$ is complete, the flow waits for a lapse of a predetermined period of time (step S-11), and turns to step S-2 when the predetermined period of time elapses, thus repeating finger operation control.

If it is determined in step S-8 that the value of the loop counter i is not equal to N, and comparison between the levels of all the signals and the threshold $L_{TH}$ is not complete, the flow returns to step S-5 to continue the processing.

In the embodiment described above, if the level of the signal, of the delay profile data, which has the highest level is lower than a threshold $L_{MAX}$, the power switches for all the fingers may be turned on. In a weak electric field, an improvement in reception characteristics takes priority over power saving. This makes it possible to produce a receptive state even in a weak electric field. This case will be described with reference to FIG. 17.

Figure 17:
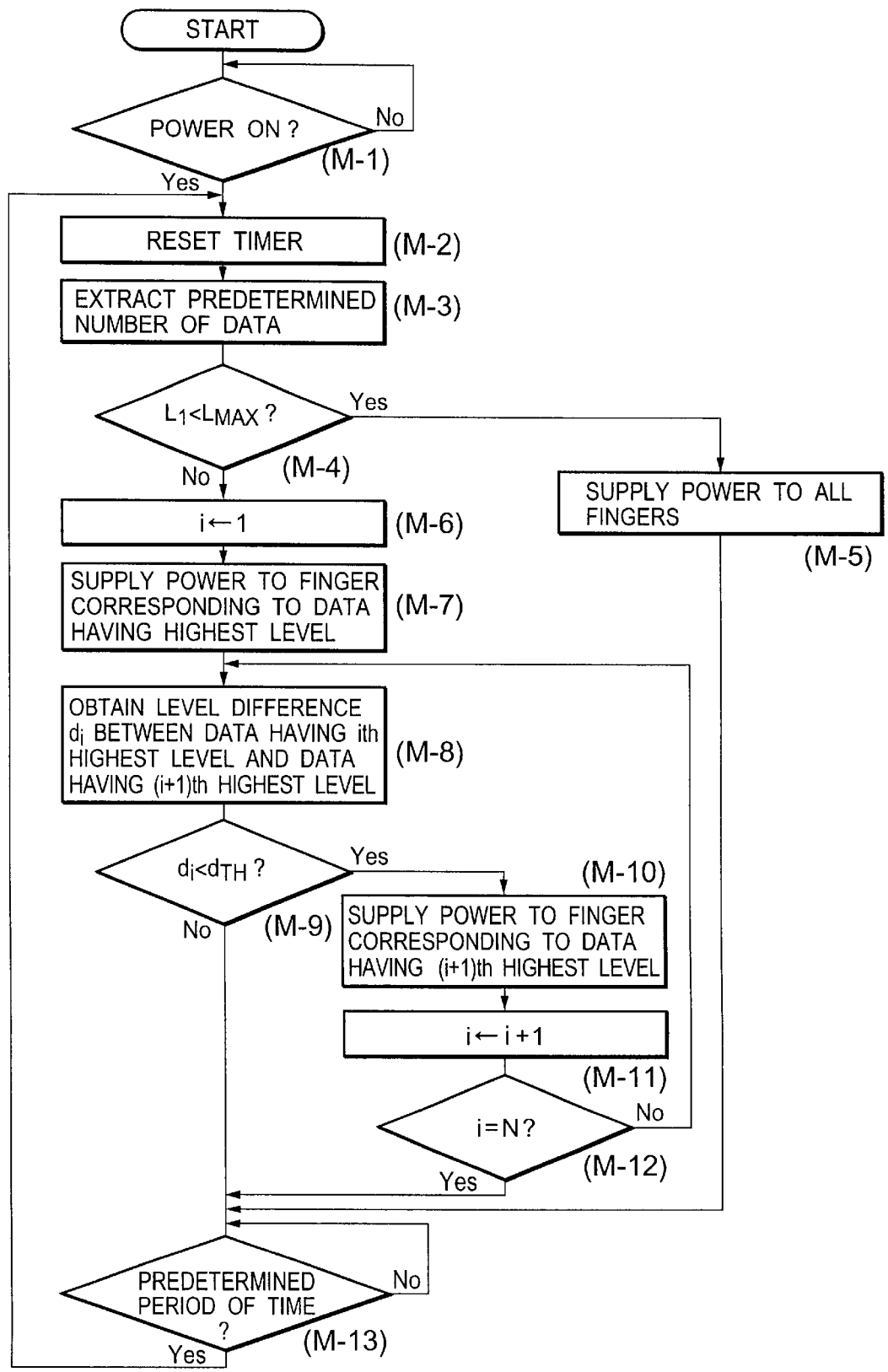
FIG. 17 is a flow chart showing the processing to be performed after the mobile station in FIG. 6 is powered on, which processing differs from that shown in the flow chart of FIG. 15 or 16.

FIG. 17 is a flow chart showing the processing to be performed after the mobile unit 21 is powered on. This processing differs from that shown in the flow charts of FIGS. 15 and 16.

When the power is turned on (step M-1), the mobile unit 21 performs perch channel acquisition processing, and repeats this processing subsequently. In this embodiment, processing of determining fingers to be operated is performed by this perch channel acquisition processing.

The processing performed by the CPU 36 will be described below with reference to the flow chart of FIG. 17.

First of all, the timer for detecting a lapse of a predetermined period of time is reset, and then operated (step M-2). The CPU 36 then causes the search section 33 to extract a predetermined number of data having higher levels from a delay profile (step M-3), and stores the extracted data in the ROM 34.

In step M-4, the CPU 36 checks whether a level $L_1$ of the signal having the highest level is lower than threshold $L_{MAX}$.

If it is determined in step M-4 that the level $L_1$ is lower than the threshold $L_{MAX}$, the CPU 36 supplies power to all the fingers (step M-5). Thereafter, the flow waits for a lapse of a predetermined period of time (step M-13) and returns to step M-2 when the predetermined period of time elapses, thus repeating finger operation control.

If it is determined in step M-4 that the level $L_1$ is not lower than the threshold $L_{MAX}$, the same processing as that shown in FIG. 15 or 16 is performed. In the case shown in FIG. 17, the same processing as that shown in FIG. 15 is performed. That is, steps M-6 to M-13 in FIG. 17 correspond to steps F-4 to F-11 in FIG. 15. For this reason, a description of steps M-6 to M-13 in FIG. 17 will be omitted.

A mobile station of an embodiment different from that shown in FIG. 6 according to the present invention will be described next.

Figure 18:
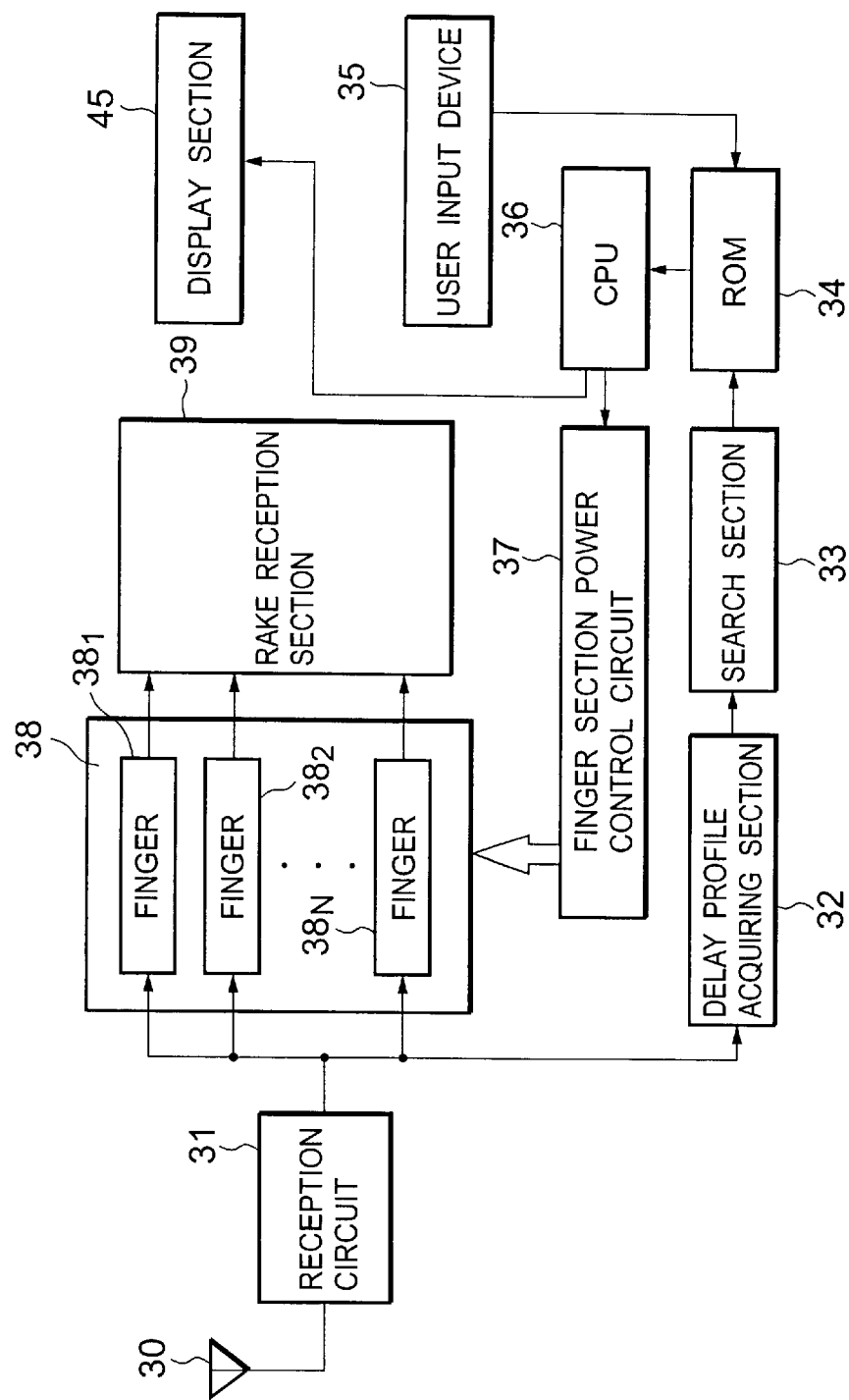
FIG. 18 is a block diagram showing a mobile station according to another embodiment of the present invention, which differs from the one shown in FIG. 6.

FIG. 18 is a block diagram showing a mobile station of an embodiment different from that shown in FIG. 6 according to the present invention.

Referring to FIG. 18, the mobile station has an antenna 30 for receiving radio waves from a base station 22, a reception circuit 31 for, for example, demodulating the reception signal received through the antenna 30, a delay profile acquiring section 32 for obtaining the intensity of each multi-path signal by using an output from the reception circuit 31 and outputting the resultant data as a delay profile, a search section 33 for extracting data, of the data of the delay profile from the delay profile acquiring section 32, which correspond to the paths of signals having the highest intensity to an intensity of predetermined ordinal number, a user input device 35 used by the user to input to a threshold (to be described later), a ROM 34 storing the data extracted by the search section 33 and the threshold input through the user input device 35, a CPU 36 for executing processing for determining a finger which is to be powered on the basis of the data extracted by the search section 33 and stored in the ROM 34 and the threshold input through the user input device 35, a finger section 38 constituted by fingers $38_1$ to $38_N$ for despreading and demodulating an output from the reception circuit 31 with predetermined delay times, a finger section power control circuit 37 for controlling power to the finger section 38 on the basis of a notification from the CPU 36, a RAKE reception section 39 for RAKE-combining signals from the respective fingers of the finger section 38, and a display section 45 for displaying the operation state of each finger upon reception of the result notified from the CPU 36.

Similar to FIG. 6, FIG. 18 does not show the arrangement of the transmission side of the mobile unit 21 because it is irrelevant to the gist of the present invention.

The same reference numerals as in FIG. 16 denote the same parts in FIG. 18, and a detailed description thereof will be omitted.

A characteristic feature of this embodiment is that it has the display section 45 shown in FIG. 18. The display section 45 will be described below with reference to the accompanying drawings.

Figure 19:
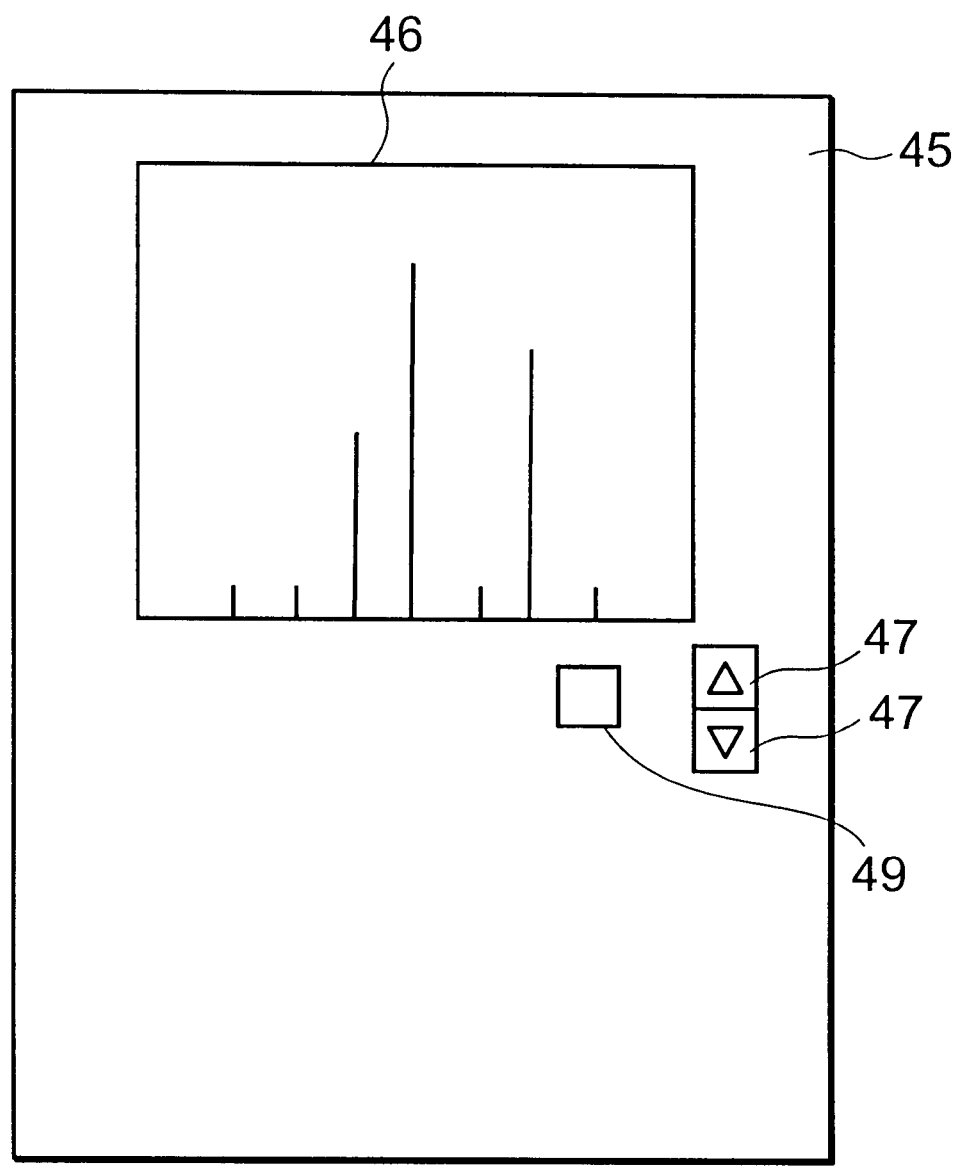
FIG. 19 is a view schematically showing an example of the outer appearance of a display section in FIG. 18.

FIG. 19 schematically shows the outer appearance of an example of the display section 45 shown in FIG. 18.

Referring to FIG. 19, the display section 45 has a display window 46 constituted by an LCD and the like, up and down buttons 47 and 48 operated by the user to set the above threshold, and a display switching button 49 for switching contents to be displayed on the display window 46.

The user can switch the contents to be displayed on the display window 46, e.g., the address book stored in a memory (not shown) or information indicating the operation state of each finger, by repeatedly pressing the display switching button 49.

The up and down buttons 47 and 48 are operated by the user to set the threshold $d_{TH}$ described with reference to FIG. 15 or the threshold $L_{HT}$ described with reference to FIG. 16. The user can increase the current threshold by pressing the up button 47, and can decrease the current threshold by pressing the down button 48.

FIG. 19 shows a case wherein the operation state of each finger is displayed on the display window 46 upon operation of the display switching button 49. In this case, the bar graph indicates the magnitude of the reception level of each finger in use (to which power is supplied).

In the case shown in FIG. 19, the number of fingers is 7, i.e., N is 7 in the above case. FIG. 19 shows that power is supplied to only the fingers corresponding to the third, fourth, and sixth bars in the graph.

When the user presses the down button 48 in this state, the threshold decreases. In the case shown in FIG. 16, the number of paths in a multi-path through which radio waves are received by the mobile station increases. Consequently, the number of bars displayed on the display window 46 increases.

As in this embodiment, the use of the display section 45 allows the user to recognize a reception state, thus implementing the function of providing interesting and useful information for the user.

In this embodiment, the operation state of each finger is displayed on the display section 45. However, the occurrence state of multi-path may be displayed on the display section 45.

In each embodiment described above, the present invention is applied to a mobile station in a mobile communication system. However, the present invention is not limited to this and can be generally applied to other types of reception apparatuses.

What is claimed is:

1. A CDMA reception apparatus having a plurality of fingers and serving to perform RAKE reception by RAKE-combining outputs from said plurality of fingers, comprising:

multi-path detecting means for detecting a multi-path consisting of a plurality of radio waves arriving with some delay times by despreading a reception signal; and delay profile generating means for generating a delay profile by obtaining reception power levels of all reception signals in the multi-path detected by said multi-path detecting means, wherein a difference $d_i$ in level between a signal having an ith highest level and a signal having an (i+1)th highest level of data of the delay profile is obtained, and operation of a finger corresponding to a signal having a low level is stopped on the basis of the difference $d_i$ and a predetermined threshold $d_{TH}$.

2. An apparatus according to claim 1, wherein the difference $d_i$ in level between the signal having the ith highest level and the signal having the (i+1)th highest level of data of the delay profile is obtained, and operation of a finger corresponding to a signal having a level lower than that of the signal having the (i+1)th highest level is stopped if the difference $d_i$ is not less than the predetermined threshold $d_{TH}$.

3. An apparatus according to claim 1, wherein if the difference $d_i$ in level between the signal having the ith highest level and the signal having the (i+1)th highest level of data of the delay profile is not more than a predetermined value, and a difference $d_{i+1}$ in level between the signal having the (i+1)th highest level and a signal having an (i+2)th highest level is not less than the predetermined value, operation of a finger corresponding to a signal having a level lower than that of the signal having the (i+2)th highest level is stopped.

4. An apparatus according to claim 1, further comprising a user input device by which a user can set the threshold.

5. An apparatus according to claim 1, further comprising display means for displaying information indicating the number of fingers, of said plurality of fingers, to which power is supplied.

6. An apparatus according to claim 4, further comprising display means for displaying information indicating the number of fingers, of said plurality of fingers, to which power is supplied.

7. A power control method for a CDMA reception apparatus having a plurality of fingers and serving to perform RAKE reception by RAKE-combining outputs from said plurality of fingers, comprising the steps of:

detecting a multi-path consisting of a plurality of radio waves arriving with some delay times by despreading a reception signal; and generating a delay profile by obtaining reception power levels of all reception signals in the multi-path, wherein a difference $d_i$ in level between a signal having an ith highest level and a signal having an (i+1)th highest level of data of the delay profile is obtained, and operation of a finger corresponding to a signal having a low level is stopped on the basis of the difference $d_i$ and a predetermined threshold $d_{TH}$.

8. A method according to claim 7, wherein the difference $d_i$ in level between the signal having the ith highest level and the signal having the (i+1)th highest level of data of the delay profile is obtained, and operation of a finger corresponding to a signal having a level lower than that of the signal having the (i+1)th highest level if the difference $d_i$ is not less than the predetermined threshold $d_{TH}$ is stopped.

9. A method according to claim 8, wherein if the difference $d_i$ in level between the signal having the ith highest level and the signal having the (i+1)th highest level of data of the delay profile is not more than a predetermined value, and a difference $d_{i+i}$ in level between the signal having the (i+1)th highest level and a signal having an (i+2)th highest level is not less than the predetermined value, operation of a finger corresponding to a signal having a level lower than that of the signal having the (i+2)th highest level is stopped.

* * * * *